(12) United States Patent
Hase et al.

(10) Patent No.: US 10,352,390 B2
(45) Date of Patent: Jul. 16, 2019

(54) DAMPER AND METHOD OF ASSEMBLING DAMPER

(71) Applicant: Hitachi Automotive Systems, Ltd., Ibaraki (JP)

(72) Inventors: Kengo Hase, Ibaraki (JP); Fumiyuki Yamaoka, Ibaraki (JP); Shunsuke Mori, Ibaraki (JP); Mikio Yamashita, Ibaraki (JP); Daiki Miyazawa, Ibaraki (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 0 days.

(21) Appl. No.: 15/562,483

(22) PCT Filed: Sep. 27, 2016

(86) PCT No.: PCT/JP2016/078359
§ 371 (c)(1),
(2) Date: Sep. 28, 2017

(87) PCT Pub. No.: WO2017/073218
PCT Pub. Date: May 4, 2017

(65) Prior Publication Data
US 2018/0094692 A1    Apr. 5, 2018

(30) Foreign Application Priority Data
Oct. 27, 2015  (JP) .................................. 2015-210969

(51) Int. Cl.
*F16F 9/46*    (2006.01)
*F16F 9/32*    (2006.01)
(Continued)

(52) U.S. Cl.
CPC ................ *F16F 9/461* (2013.01); *F16F 9/18* (2013.01); *F16F 9/325* (2013.01); *F16F 9/464* (2013.01);
(Continued)

(58) Field of Classification Search
CPC .... F16F 9/46; F16F 9/461; F16F 9/464; F16F 9/325; F16F 9/18; F16F 9/185;
(Continued)

(56) References Cited

U.S. PATENT DOCUMENTS

| 4,111,464 A | * | 9/1978 | Asano ..................... F16L 47/12 |
| | | | 285/111 |
| 5,937,975 A | * | 8/1999 | Forster .................... F16F 9/463 |
| | | | 188/266.6 |

(Continued)

FOREIGN PATENT DOCUMENTS

WO    WO-2015041095 A1 *  3/2015    ................ F16F 9/34

OTHER PUBLICATIONS

International Search Report dated Dec. 27, 2016 for WO 2017/073218 A1.

*Primary Examiner* — Thomas J Williams
(74) *Attorney, Agent, or Firm* — Abelman, Frayne & Schwab

(57) ABSTRACT

Provided are a damper configured such that the axial play between a coil case and a case member can be eliminated without increasing a size of a solenoid, and a method of assembling the damper. An O-ring (seal member) is elastically supported by a tapered hole formed in an inner peripheral surface of a case member and a tapered shaft formed in an outer peripheral surface of a coil case, and a retaining ring is configured to receive an axial force generated by the O-ring. The configuration enables the play between the coil case and the case member of the solenoid (Continued)

to be eliminated. A damping force regulation mechanism, and in turn the damper, may be made more compact in comparison with a case in which the O-ring is received by the opening side end face of the case member.

10 Claims, 5 Drawing Sheets

(51) Int. Cl.
*F16F 9/18* (2006.01)
*F16K 31/06* (2006.01)
*F16L 37/088* (2006.01)

(52) U.S. Cl.
CPC ...... *F16K 31/0679* (2013.01); *F16K 31/0693* (2013.01); *F16F 2226/04* (2013.01); *F16F 2230/0082* (2013.01); *F16L 37/088* (2013.01)

(58) Field of Classification Search
CPC ..... F16F 9/062; F16F 2226/04; F16L 37/088; F16K 31/0668; F16K 31/0689; F16K 31/0696

USPC .......... 188/266.5, 266.63; 303/119.1, 119.2, 303/119.3, DIG. 10

See application file for complete search history.

(56) References Cited

U.S. PATENT DOCUMENTS

| | | | | |
|---|---|---|---|---|
| 6,000,508 | A * | 12/1999 | Forster | F16F 9/46 188/299.1 |
| 6,035,979 | A * | 3/2000 | Forster | F16F 9/34 188/266.6 |
| 6,044,939 | A * | 4/2000 | Forster | F16F 9/46 188/266.6 |
| 8,348,027 | B2 * | 1/2013 | Murakami | F16F 9/465 188/266.5 |
| 8,556,049 | B2 * | 10/2013 | Jee | F16F 9/464 137/625.65 |
| 2016/0223043 | A1 * | 8/2016 | Hagidaira | F16F 9/34 |
| 2018/0266514 | A1 * | 9/2018 | Mori | F16F 9/34 |

* cited by examiner

DAMPER AND METHOD OF ASSEMBLING DAMPER

CROSS REFERENCE TO RELATED APPLICATIONS

This application is a national phase of PCT application No. PCT/JP2016/078359, filed on 27 Sep. 2016, which claims priority from Japanese patent application No. 2015-210969, filed on 27 Oct. 2015, all of which are incorporated herein by reference.

TECHNICAL FIELD

The present invention relates to a damper which generates a damping force by controlling the flow of a hydraulic fluid in response to a stroke of a piston rod, and a method of assembling the same.

BACKGROUND

For example, Patent Document 1 discloses a solenoid in which a mold coil (coil case) and a solenoid main body (case member) are integrated by a snap ring (retaining ring) mounted between a groove formed in an outer peripheral surface of the mold coil and a groove formed in an inner peripheral surface of the case. By the way, in a case in which the solenoid is applied to an actuator configured to regulate a damping force of a damping force regulation type damper in a semi-active suspension mounted in a vehicle, there is a problem in that abnormal noise is generated from the solenoid due to a play in a direction along an axis of the solenoid (hereinafter, referred to as an "axial direction") due to an axial gap between the retaining ring and the groove, or a degree of design flexibility of a magnetic circuit is restricted.

In order to eliminate the play, it has been proposed to sandwich an O-ring at an outer peripheral-side position of the retaining ring in the axis direction by the mold coil and the solenoid main body. However, because the solenoid increases in diameter in a radial direction (which requires the increase in thickness), the size of the solenoid is increased.

PRIOR ART DOCUMENT

Patent Document

Patent Document 1: International Publication No. WO 2003/056579

DISCLOSURE OF THE INVENTION

Problems to be Solved

An object of the present invention is to provide a damper configured to eliminate the axial play between a coil case and a case member without increasing the size of a solenoid, and a method of assembling the damper.

Means to Solve the Problems

A damper according to an exemplary embodiment of the present invention includes: a cylinder in which a hydraulic fluid is encapsulated; a piston which is slidably fitted into the cylinder; a piston rod which is connected to the piston and extends to an outside of the cylinder; and a damping three generating mechanism which has a damping valve that generates a damping force by controlling a flow of the hydraulic fluid generated as the piston slides in the cylinder, the damping force generating mechanism includes: a coil case which accommodates a coil and has an axial hole; a case member in which the coil case is disposed at an opening side at one side of the case member and the damping valve is disposed at the other side; a plunger which is provided in the axial hole of the coil case and regulates the damping force of the damping valve while moving in an axial direction of the axial hole by energization to the coil; and a retaining ring which is mounted between a groove formed in an outer peripheral surface of the coil case and a groove formed in an inner peripheral surface of the case member so as to integrate the coil case and the case member. A seal member is provided between the coil case and the case member such that the seal member is positioned closer to the opening side of the case member than the groove of the case member. The seal member is sandwiched between a tapered hole, which is formed in the case member and increases in diameter toward the opening, and the outer peripheral surface of the coil case such that the seal member elastically supports the coil case with respect to the case member in a radial direction and the axial direction of the coil case.

In a method of assembling a damper according to another exemplary embodiment of the present invention, a damping three generating mechanism may be assembled by an assembling process including: integrating the case member and the damping valve; inserting the integrated case member and damping valve into a valve case; and inserting the coil case into the case member integrated with the valve case.

According to the damper and the method of assembling the damper according to the exemplary embodiments of the present invention, it is possible to eliminate the axial play between the coil case and the case member without increasing the size of the solenoid.

DETAILED DESCRIPTION TO EXECUTE THE INVENTION

An exemplary embodiment of the present invention will be described with reference to the accompanying drawings. Further, in the billowing description, an up and down direction in FIG. 1 will be referred to as an up and down direction as it is.

Figure 1:
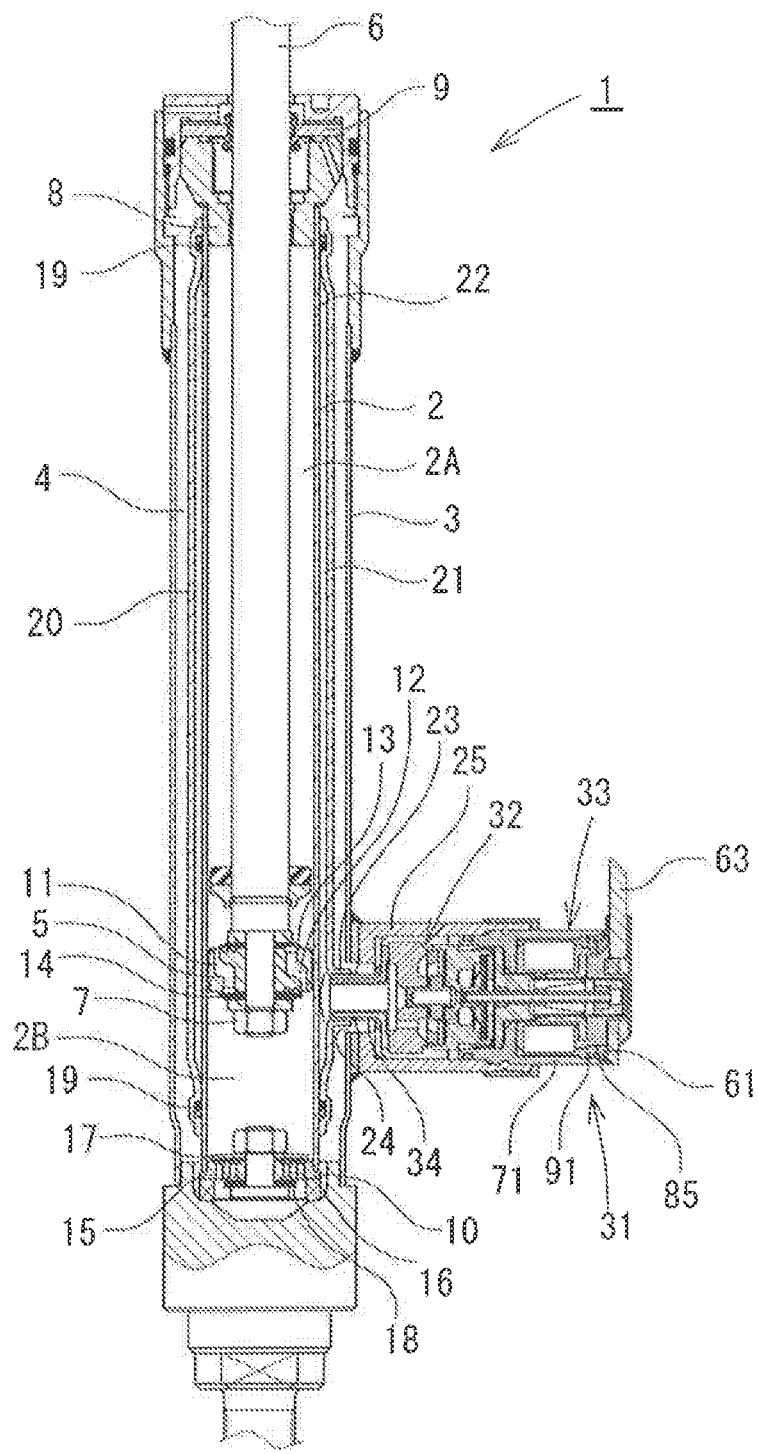
FIG. 1 is a cross-sectional view of a damper according to the present exemplary embodiment which is taken along a uniaxial plane.

As illustrated in FIG. 1, a damping force regulation type damper 1, which is a damper according to the present exemplary embodiment, has a multi-cylinder structure in which an outer cylinder 3 is provided outside a cylinder 2, and a reservoir 4 is formed between the cylinder 2 and the outer cylinder 3. A piston 5 is slidably is fitted into the cylinder 2, and the interior of the cylinder 2 is divided, by the piston 5, into two chambers of an upper cylinder chamber 2A and a lower cylinder chamber 2B. One end of a piston rod 6 is connected to the piston 5 by a nut 7, and the other end of the piston rod 6 passes through the upper cylinder chamber 2A and is inserted through a rod guide 8 and an oil seal 9 mounted at upper end portions of the cylinder 2 and the outer cylinder 3, so that the other end of the piston rod 6 extends to the outside of the cylinder 2.

Further, a base valve 10, which separates the lower cylinder chamber 2B and the reservoir 4 from each other, is provided in a lower end portion of the cylinder 2. Passages 11 and 12, which allow the upper cylinder chamber 2A and the lower cylinder chamber 2B to communicate with each other, are formed in the piston 5. A check valve 13, which permits the oil (hydraulic fluid) only to flow from the lower cylinder chamber 2B side to the upper cylinder chamber 2A side, is provided in the passage 12. In addition, a disk valve 14, which relieves the pressure of the oil at the upper cylinder chamber 2A side toward the lower cylinder chamber 2B side by being opened when the pressure reaches a preset pressure, is provided in the passage 11.

Passages 15 and 16, which allow the lower cylinder chamber 2B and the reservoir 4 to communicate with each other, are formed in the base valve 10. A check valve 17, which permits the oil only to flow from the reservoir 4 side to the lower cylinder chamber 2B side, is provided in the passage 15. In addition, a disk valve 18, which relieves the pressure of the oil in the lower cylinder chamber 2B side toward the reservoir 4 side by being opened when the pressure reaches a predetermined pressure, is provided in the passage 16. Further, the oil, as a hydraulic fluid, is encapsulated in the cylinder 2, and the oil and gas are encapsulated in the reservoir 4.

A separator tube 20 is fitted onto both upper and lower end portions of the cylinder 2 through seal members 19, and an annular passage 21 is formed between the cylinder 2 and the separator tube 20. The annular passage 21 communicates with the upper cylinder chamber 2A by a passage 22 provided in a sidewall in the vicinity of the upper end portion of the cylinder 2. A cylindrical branch pipe 23, which protrudes laterally (in a right direction in FIG. 1), is formed at a lower side of the separator tube 20. An opening 24, which has a larger diameter than the branch pipe 23, is formed M the sidewall of the outer cylinder 3 so as to be concentric with the branch pipe 23, and a cylindrical valve case 25 is coupled by welding or the like so as to surround the opening 24. A damping force generating mechanism 31 is accommodated in the valve case 25.

(Damping Force Generating Mechanism) As illustrated in FIG. 1, the damping force generating mechanism 31 is provided such that a base end side (left end side in FIG. 1) of the damping force generating mechanism 31 is disposed to be interposed between the reservoir 4 and the annular passage 21, and the tip end side (the right end side in FIG. 1) of the damping force generating mechanism 31 protrudes radially outward (in the right direction in the left and right direction in FIG. 1) from the outer cylinder 3. The damping three generating mechanism 31 generates a damping force by controlling a flow of the oil from the annular passage 21 to the reservoir 4 by using a damping valve 32. In addition, the generated damping three is variably regulated by regulating a valve opening pressure of the damping valve 32 by a solenoid 33 (to be described below) which is applied as a variable damping force actuator.

Figure 2:
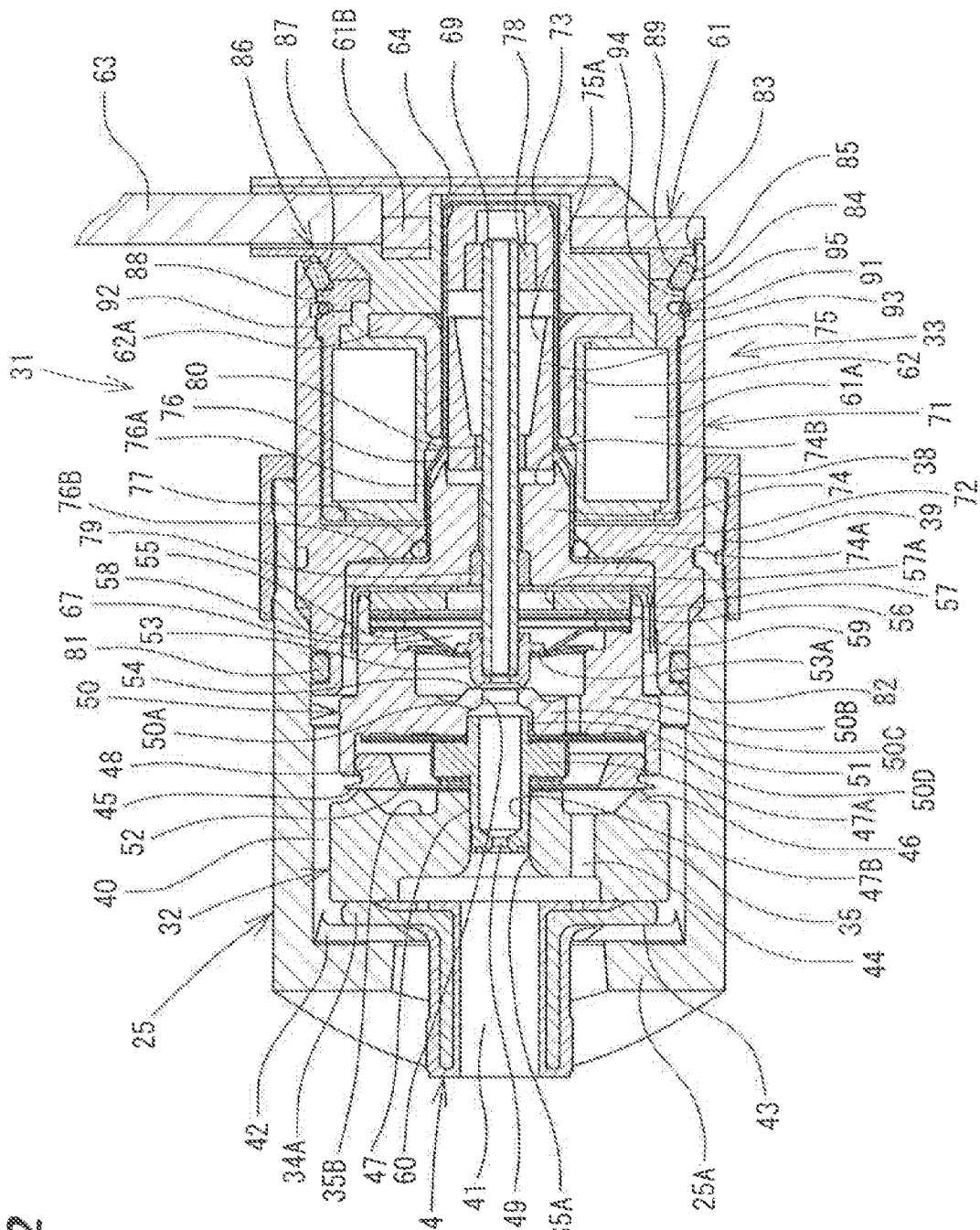
FIG. 2 is a cross-sectional view of a damping force generating mechanism according to the present exemplary embodiment which is taken along a uniaxial plane.

As illustrated in FIG. 2, the damping force generating mechanism 31 includes: the aforementioned valve case 25; a passage member 34 which is fixed to the branch pipe 23 of the separator tube 20 at a base end side (the left end side in FIG. 2) thereof and has an annular flange portion 34A formed at a tip side (the right end side in FIG. 2) thereof and disposed to have a gap with respect to an inner flange portion 25A at a base end side of a valve case 25; and a valve member 35 which is in contact with the flange portion 34A of the passage member 34. A threaded portion 39 is formed at a tip end side of the valve case 25, and the valve case 25 and the case member 71 of the solenoid 33 are coupled to each other by a nut 38 screw-coupled to the threaded portion 39. In add an annular passage 40 which communicates with the reservoir 4, is formed between an inner peripheral surface of the valve case 25 and the damping valve 32.

A passage 41, one side of which communicates with the annular passage 21 and the other side extends to the valve member 35, is formed inside the passage member 34. In addition, a ring-shaped spacer 42 is sandwiched between the flange portion 34A of the passage member 34 and the inner flange portion 25A of the valve case 25. A plurality of passages 43, which allows the passage 40 and the reservoir 4 to communicate with each other, is formed in the spacer 42.

The valve member 35 has a plurality of passages 44 provided around an axial hole 35A so as to be spaced apart from each other in a circumferential direction. One side (left side in FIG. 2) of each of the passages 44 communicates with the passage 41 of the passage member 34. In addition, the other side (right side in FIG. 2) end face of the valve member 35 has an annular concave portion 35B which is formed to surround the other side opening of the passage 44, and an annular seat portion 46 which is positioned outside the annular concave portion 35B in the radial direction such that a main disk valve 45 is seated on or separated from the annular seat portion 46. Further, the passage 44 of the valve member 35 allows the oil to flow between the annular passage 21 side passage 41 and the reservoir 4 side passage 40 through the main disk valve 45.

An inner peripheral side of the main disk valve 45 is sandwiched between the valve member 35 and a large diameter portion 47A of a pilot pin 47, and an outer peripheral side of the main disk valve 45 is seated on the seat portion 46 of the valve member 35. An annular seal member 48 is fixed to the back side outer peripheral portion of the main disk valve 45. Further, the main disk valve 45 is opened as the main disk valve 45 is separated from the seat portion 46 by receiving a pressure at passage 44 side (the annular passage 21 side) of the valve member 35, thereby allowing the passage 44 (annular passage 21) of the valve member 35 to communicate with the passage 40 (reservoir 4).

The pilot pin 47 is formed in a stepped cylindrical shape having the large diameter portion 47A in an intermediate portion in the axial direction, and an orifice 49 is formed at one end portion of an axial hole 47B. One end side (left end side in FIG. 2) of the pilot pin 47 is press-fitted into the axial hole 35A of the valve member 35, so that the main disk valve 45 is sandwiched between the large diameter portion 47A and the valve member 35 as described above. The other end side (right end side in FIG. 2) of the pilot pin 47 is fitted into an axial hole 50A of a pilot body 50. In this state, a passage 51, which extends in the axial direction, is formed between the axial hole 50A of the pilot body 50 and the other end side of the pilot pin 47. The passage 51 is connected to a back-pressure chamber 52 formed between the main disk valve 45 and the pilot body 50.

The pilot body 50 is formed in a substantially bottomed-cylinder shape and has a cylindrical portion 50B which has a stepped hole formed therein and a bottom portion 50C which blocks the cylindrical portion 50B, and the aforementioned axial hole 50A, into which the other end side of the pilot pin 47 is fitted, is formed in the bottom portion 50C. A protruding cylindrical portion 50D, which is positioned at an outer diameter side and protrudes toward the valve member 35 over the entire circumference, is formed at one end side (left end side in FIG. 2) of the bottom portion 50C of the pilot body 50. The seal member 48 of the main disk valve 45 is fitted to the inner peripheral surface of the protruding cylindrical portion 50D in a liquid-tight manner, so that the back-pressure chamber 52 is formed between the main disk valve 45 and the pilot body 50. The internal pressure in the back-pressure chamber 52 is applied to the main disk valve 45 in a direction in which the main disk valve 45 is closed, that is, in a direction in which the main disk valve 45 is seated on the seat portion 46 of the valve member 35.

A seat portion 54 which is formed to surround the axial hole 50A such that a pilot valve member 53 is seated thereon or separated therefrom, is provided at the other end side (right end side in FIG. 2) of the bottom portion 50C of the pilot body 50. In addition, a return spring 55, which biases the pilot valve member 53 in a direction in which the pilot valve member 53 is moved away from the seat portion 54 of the pilot body 50, a disk valve 56, which constitutes a fail-safe valve when the solenoid 33 is not energized (when the pilot valve member 53 is maximally spaced apart from the seat portion 54), and a holding plate 57, which has a passage 57A formed therein, are provided inside the cylindrical portion 50B of the pilot body 50.

A cap 58 is fitted with and fixed to an opening end of the cylindrical portion 50B of the pilot body 50 in a state in which the return spring 55, the disk valve 56, the holding plate 57, and the like are provided inside the cylindrical portion 50B. Passages 59 are formed in the cap 58, for example, at four points in the circumferential direction so as to serve as flow paths that allow the oil, which has flown to the solenoid 33 through the passage 57A of the holding plate 57, to flow to the passage 40 (reservoir 4) therethrough.

The pilot valve member 53 constitutes a pilot valve together with the pilot body 50. The pilot valve member 53 is formed in a substantially cylindrical shape, and a tip end portion of the pilot valve member 53, which is seated on or separated from the seat portion 54 of the pilot body 50, is formed in a tapered shape having a narrow end. One end of an operating pin 69 of the solenoid 33 is fixedly fined into the pilot valve member 53, and the valve opening pressure of the pilot valve member 53 is regulated in response to the energisation to the solenoid 33. In addition, a flange portion 53A, which serves as a spring bearing, is formed over the entire circumference at the base end side (left end side in FIG. 2) of the pilot valve member 53. When the solenoid 33 is not energized, that is, when the pilot valve member 53 is maximally spaced apart from the seat portion 54, the flange portion 53A comes into contact with the disk valve 56 so as to constitute a fail-safe valve.

Figure 3:
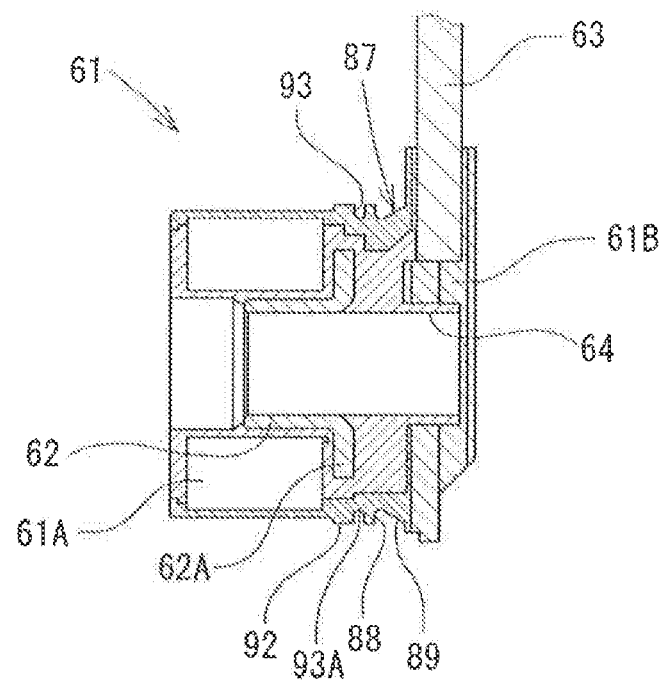
FIG. 3 is a cross-sectional view of a coil case according to the present exemplary embodiment which is taken along a uniaxial plane.

(Solenoid) As illustrated in FIG. 2, the solenoid 33 includes a coil case 61 and the aforementioned case member 71. As illustrated in FIG. 3, the coil case 61 is formed in a substantially cylindrical shape by molding a coil 61A and a core 62, and a cable 63 is connected to a cable connecting portion 61B that protrudes to the radial outside (the upper side in FIG. 3). The coil 61A generates a magnetic force by a supply of electric power (energization) through the cable 63. The core 62 is a member made of a magnetic material, and is formed in a cylindrical shape having a flange portion 62A at one end thereof.

Figure 4:
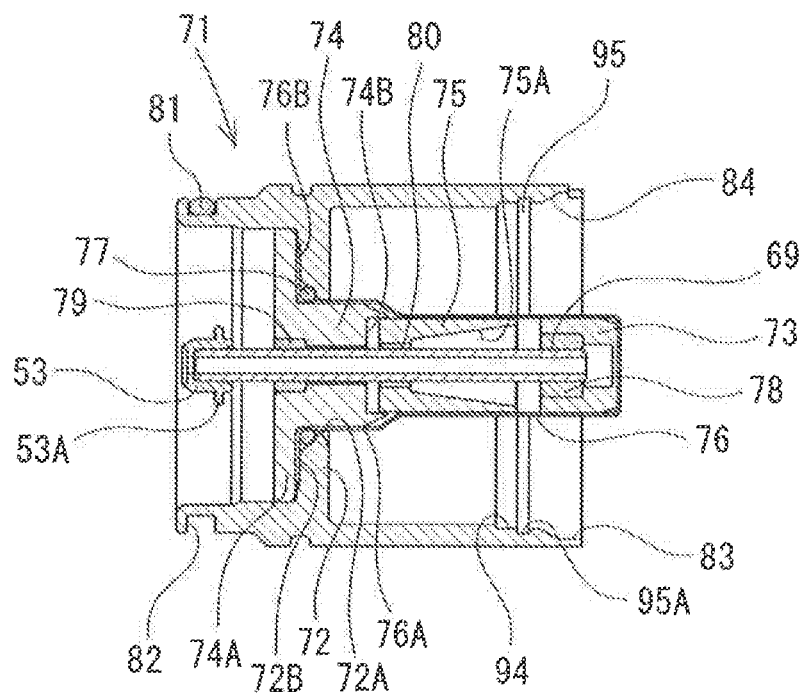
FIG. 4 is a cross-sectional view of a case member according to the present exemplary embodiment which is taken along a uniaxial plane.

As illustrated in FIG. 4, the case member 71 is thrilled in a substantially cylindrical shape, and a bottom portion 72 having an axial hole 72A is formed at an intermediate position in the axial direction (left and right direction in FIG. 4). A large diameter portion 76A of a cap 76, which covers a stator core 73 made of a non-magnetic material, a core 74, and a plunger 75, is fitted into the axial hole 72A of the bottom portion 72 of the case member 71. The cap 76 is formed in a substantially bottomed-cylinder shape by deep drawing, and the stator core 73 is fitted to a tip end portion (a bottom portion having a drawn shape) of the cap 76. In addition, the plunger 75, is slidably inserted into an inner circumference of the cap 76, in which the plunger 75 is disposed to form a gap in the axial direction with the stator core 73. Further, an outer circumference of the core 74 is fitted to the inner circumference of the large diameter portion 76A of the cap 76. Further, the damping valve 32 side end (left end in FIG. 4) of the plunger 75 is slidably fitted to a concave portion 74B formed in one end face of the core 74.

A flange portion 74A is formed at the damping valve 32 side end (left end in FIG. 4) of the core 74. An outer peripheral surface of the flange portion 74A and a peripheral edge portion of a surface of the core 74 at a side (right side in FIG. 4) opposite the damping valve 32 side are in contact with the case member 71. In addition, the cap 58 of the damping valve 32 is in contact with the damping valve 32 side surface of the flange portion 74A of the core 74. Further, a flange portion 76B of the cap 76 is in close contact with a surface of the core 74 at the side opposite the damping valve 32. The flange portion 76B of the cap 76 is sandwiched between an annular concave portion 72B, which is formed in the damping valve 32 side surface of the bottom portion 72 of the case member 71, and the flange portion 74A of the core 74. Further, a portion between the case member 71 and the cap 76 is sealed by an O-ring 77. In addition, the O-ring 77 is accommodated in an annular space formed by C-chamfering of the axial hole 72A of the bottom portion 72 of the case member 71.

Meanwhile, the aforementioned operating pin 69 is supported to be movable in the axial direction (left and right direction in FIG. 4) by a bushing 78 set to the stator core 73 and a hushing 79 set to the core 74. The operating pin 69 is coupled to the plunger 75 through a ring member 80. The plunger 75, which is called a movable iron core, is formed, for example, in a substantially cylindrical shape by an iron-based magnetic body, and when the coil 61A is energized so that the magnetic force is generated, the plunger 75 is attracted to the core 74 so as to generate thrust. Further, an axial hole 75A of the plunger 75 is formed in a tapered shape having a diameter that increases from the ring member 80 to the stator core 73 side (right side in FIG. 4). As such, the plunger 75 has a small thickness in a portion adjacent to the core 62, through which the exchange of magnetic force is easy, and a large thickness in a portion between the plunger 75 and the core 74, through which the exchange of magnetic force is difficult when the plunger 75 is moved upward. Therefore, weight reduction of the plunger 75 is enabled without hindering the exchange of the magnetic force, which leads to the improvement of responsiveness.

As illustrated in FIG. 2, the cap 76 is inserted into an axial hole 64 of the coil case 61 in the state in which the coil case 61 and the case member 71 are integrated. In this case, the plunger 75 inserted into the inner circumference of the cap 76 is positioned to face the core 62 in the coil case 61 through the cap 76. Further, an annular groove 82 configured to accommodates an O-ring 81 is formed in the outer peripheral surface of the damping valve 32 side end (left side end in FIG. 2) of the case member 71, and a portion between the inner peripheral surface of the valve case 25 and the outer peripheral surface of the case member 71 is sealed in a liquid-tight manner by the O-ring 81.

(Retaining Ring) Next, a coupling structure between the coil case 61 and the case member 71, implemented by a retaining ring 91 (see FIG. 5), will be described.

As illustrated in FIG. 2, the coil case 61 (shaft) and the case member 71 (hole) are integrated by being coupled to each other by the retaining ring 91. The retaining ring 91 is mounted between the annular groove 93 formed in the outer peripheral surface 92 of the coil case 61 and the annular groove 95 formed in the inner peripheral surface 94 of the case member 71. That is, the retaining ring 91 prevents a relative movement between the coil case 61 and the case member 71 in the axial direction (left and right direction in FIG. 2).

As illustrated in FIG. 3, the groove 93 of the coil case 61 is positioned closer to the cable connecting portion 61B (right side in FIG. 3) side than the coil 61A. In addition, the flange portion 62A of the core 62 extends to the vicinity of the groove 93. Therefore, the flange portion A of the core 62 may receive a force applied to the bottom portion 93A of the groove 93 when the diameter of the retaining ring 91 mounted in the groove 93 of the coil case 61 is decreased, and as a result, it is possible to prevent the deformation of the coil case 61. Further, the shape and the dimension of the groove 93 of the coil case 61 (shaft) and the shape and the dimension of the groove 95 of the case member 71 (hole) may be determined with reference to, for example, the shape and the dimension of the groove of the concentric retaining ring for the C-shaped hole according to JISB2804.

Figure 5:
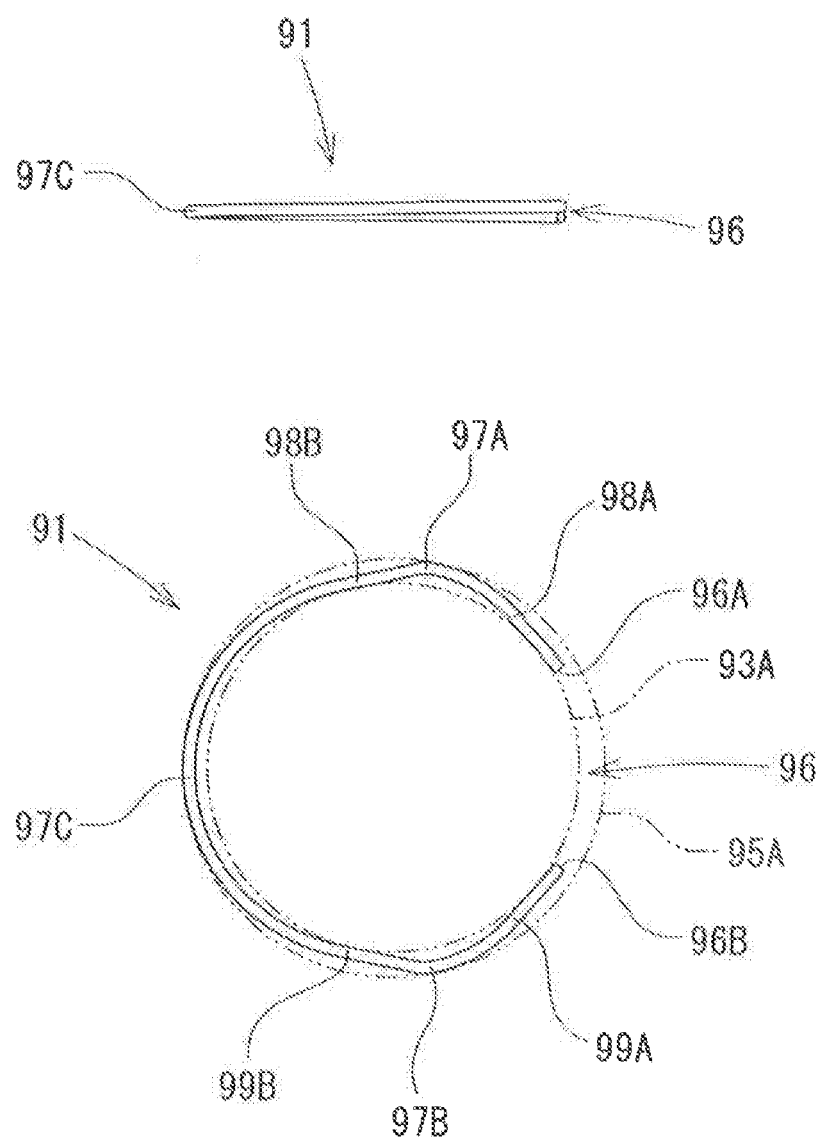
FIG. 5 is a front view and a top plan view of a retaining ring according to the present exemplary embodiment.

As illustrated in FIG. 5, the retaining ring 91 is formed in a substantially C shape, and has cut ends 96 that cross each other within a specified range. Small diameter portions 97A and 97B and a small diameter portion 97C, which have a radius of curvature smaller than a radius of the bottom portion 93A (groove bottom circle) of the groove 93 of the coil case 61, are formed in the vicinity of ends 96A and 96B of the retaining ring 91 and at a side (left side in FIG. 5) opposite the cut ends 96. The radius of curvature of the small diameter portions 97A and 97B is smaller than the radius of curvature of the small diameter portion 97C. In addition, shaft side contact portions 98A and 98B having a substantially straight shape are formed in the retaining ring 91 at both sales of the small diameter portion 97A in the circumferential direction, and shaft side contact portions 99A and 99B having a substantially straight shape are formed at both sides of the small diameter portion 97B in the circumferential direction.

As illustrated in FIG. 5, the shaft side contact portions 98A and 98B and the shaft side contact portions 99A and 99B are in external contact with the bottom portion 93A (groove bottom circle) of the groove 93 of the coil case 61 (shaft) in a state in which the retaining ring 91 is mounted between the groove 93 of the coil case 61 and the groove 95 of the case member 71. In this state, the small diameter portions 97A, 97B, and 97C of the retaining ring 91 are in internal contact with a bottom portion 95A (groove bottom circle) of the groove 95 of the case member 71 (hole).

Further, as illustrated in FIG. 4, a tapered hole 84, which has a diameter increasing toward the opening 83 and is formed continuously from the inner peripheral surface 94, is formed in the inner peripheral surface 94 of the case member 71 in the vicinity of the opening 83 and an R shape, which has a radius larger than a standardized (specified) chamfering amount, is formed on the contact portions of the retaining ring 91, which come into contact with the tapered hole 84 of the case member 71 when the coil case 61 is inserted into the case member 71, that is, the small diameter portions 97A, 97B, and 97C. Therefore, it is possible to prevent the tapered hole 84, which serves as a seal surface of an O-ring 85 (seal member) to be described below, from being damaged. That is, the retaining ring 91 does not come into contact with a corner portion of the tapered hole 84 of the case member 71 when the coil case 61 is inserted into the case member 71.

As illustrated in FIG. 2, a portion between the coil case 61 and the case member 71 is sealed by the O-ring 85 supported by an annular seal support portion 86. The seal support portion 86 is configured by the tapered hole 84 which is formed in the inner peripheral surface 94 of the case member 71, and an annular seal groove 87 which is formed in the outer peripheral surface 92 of the coil case 61. As illustrated in FIG. 3, the seal groove 87 is formed at a side (right side in FIG. 3) opposite the coil 61A with respect to the groove 93, in which the retaining ring 91 is mounted. Further, in the coil case 61, the distance from the axial hole 64 (axis of the coil case 61) to the seal groove 87 is approximately equal to the distance from the axial hole 64 to the groove 93. In other words, the distance from the axial hole 64 (axis of the coil case 61) to the O-ring 85 is approximately equal to the distance from the axial hole 64 to the retaining ring 91 in a state in which the coil case 61 and the case member 71 are integrated.

In addition, the seal groove 87 is formed to have a substantially V-shaped cross section, and has a ring-shaped wall portion 88, which is parallel to a plane perpendicular to the axis of the axial hole 64 (the axis of the coil case 61), and a tapered shaft 89. The tapered shaft 89 increases in diameter from an inner peripheral side of the wall portion 88 toward a side (right side in FIG. 3) opposite the groove 93. In addition, as illustrated in FIG. 2, the tapered shaft 89 of the coil case 61 is parallel to the tapered hole 84 of the case member 71 in the state in which the cod case 61 and the case member 71 are integrated. Further, in the state in which the coil case 61 and the case member 71 are integrated, the O-ring 85 is elastically supported (pressed) in the radial direction and the axial direction between the tapered hole 84 and the tapered shaft 89, and as a result, the reaction force of the elastically deformed O-ring 85 is applied, in the axial direction, to the coil case 61 side wall portion 88 of the seal groove 87.

(Operation) Next, an operation of the aforementioned damping three regulation type damper 1 will be described.

The damping force regulation type damper 1 is mounted between upper and lower sides of a spring of a suspension system of a vehicle. When vibration occurs in the up and down direction due to unevenness of a road surface while the vehicle travels, the damper 1 dampens the vibration of the vehicle in a manner in which the piston rod 6 is displaced to be extended and retracted from the outer cylinder 3 and the damping force is generated by the damping force generating mechanism 31. In this case, an electric current value to the coil 61A of the solenoid 33 is controlled by a controller in order to regulate the valve opening pressure of the pilot valve member 53, and as a result, the damping force generated by the damper 1 may be variably regulated.

During an extension stroke of the piston rod 6, the check valve 13 of the piston 5 is closed by the movement of the piston 5 in the cylinder 2, and the oil (hydraulic fluid) in the upper cylinder chamber 2A is pressurized before the disk valve 14 is opened. The pressurized oil passes through the passage 22 and the annular passage 21, and flows into the passage member 34 of the damping force generating mechanism 31 from the branch pipe 23 of the separator tube 20. In this case, the oil corresponding to the extent of movement of the piston 5 opens the check valve 17 of the base valve 10, and flows into the lower cylinder chamber 2B from the reservoir 4. Further, when the pressure in the upper cylinder chamber 2A reaches the valve opening pressure of the disk valve 14 of the piston 5, the disk valve 14 is opened and the pressure in the upper cylinder chamber 2A is relieved to the lower cylinder chamber 2B, thereby preventing the pressure in the upper cylinder chamber 2A from being excessively increased.

Meanwhile, during the retraction stroke of the piston rod 6, the check valve 13 of the piston 5 is opened by the movement of the piston 5 in the cylinder 2, and the check valve 17 in the passage 15 of the base valve 10 is closed. Further, before the disk valve 18 is opened, the oil in the piston lower chamber 2B flows into the upper cylinder chamber 2A, and the oil corresponding to a volume of the piston rod 6 inserted into the cylinder 2 flows into the reservoir 4 from the upper cylinder chamber 2A through the same path used for the extension stroke. Further, the disk valve 18 is opened when the pressure in the lower cylinder chamber 2B reaches the valve opening pressure of the disk valve 18 of the base valve 10, and the pressure in the lower cylinder chamber 2B is relieved to the reservoir 4, thereby preventing the pressure in the lower cylinder chamber 2B from being excessively increased.

On the other hand, in the damping three generating mechanism 31, before the main disk valve 45 is opened (a low speed region of the piston), the oil flowing into the passage 41 of the passage member 34 passes through the axial hole 35A of the valve member 35, the axial hole 47B of the pilot pin 47, and the axial hole 50A of the pilot body 50, pushes and opens the pilot valve member 53, and flews into the pilot body 50. The oil flowing into the pilot body 50 passes between the flange portion 53A of the pilot valve member 53 and the disk valve 56 and through the passage 57A of the holding plate 57, the passage 59 of the cap 58, and the passage 40 of the valve case 25, and then flows into the reservoir 4. When the speed of the piston is increased and the pressure in the passage 41 of the passage member 34, that is, the pressure in the upper cylinder chamber 2A reaches the valve opening pressure of the main disk valve 45, the oil flowing into the passage 41 of the passage member 34 passes through the passage 44 of the valve member 35, pushes and opens the main disk valve 45, passes through the passage 40 of the valve case 25, and then flows into the reservoir 4.

Therefore, during the extension stroke and the retraction stroke of the piston rod 6, the damping force is generated by the orifice 49 of the pilot pin 47 and the valve opening pressure of the pilot valve member 53 before the main disk valve 45 of the damping valve 32 is opened, and the damping force is generated in response to an opening degree of the main disk valve 45 after the main disk valve 45 is opened. In this case, the damping force may be directly controlled, regardless of the piston speed, by regulating the valve opening pressure of the pilot valve member 53 by applying electric power to the coil 61A of the solenoid 33.

Specifically, when the electric current to the coil 61A is decreased so that thrust of the plunger 75 is decreased, the valve opening pressure of the pilot valve member 53 is decreased, and as a result, the damping force at a soft side is generated. On the other hand, when the electric current to the coil 61A is increased so that thrust of the plunger 75 increased, the valve opening pressure of the pilot valve member 53 is increased, and as a result, the damping force at a hard side is generated. In this case, the internal pressure in the back-pressure chamber 52, which communicates with the passage 51 at an upstream side, is changed by the valve opening pressure of the pilot valve member 53. The it is possible to simultaneously regulate the valve opening pressure of the main disk valve 45 by controlling the valve opening pressure of the pilot valve member 53, and as a result, damping farce properties can be widely regulated.

In addition, in the case in which thrust of the plunger 75 is lost when a failure such as a disconnection of the coil 61A or a breakdown of a vehicle-mounted controller occurs, the pilot valve member 53 is retracted by the spring force of the return spring 55 so as to open the passage 60 of the pilot body 50, and the flange portion 53A of the pilot valve member 53 is brought into contact with the disk valve 56 (fail-safe disk valve) so as to close a flow path between a valve chamber 67 and the passage 40 in the valve case 25. In this state, the flow of the oil from the passage 60 to the passage 40 in the valve case 25 is controlled in the valve chamber 67 by the disk valve 56, and as a result, a desired damping force may be obtained by setting the valve opening pressure of the disk valve 56, and the internal pressure in the back-pressure chamber 52, that is, the valve opening pressure of the main disk valve 45 may be regulated. As a result, an appropriate damping force may be obtained even though a failure occurs.

Figure 6:
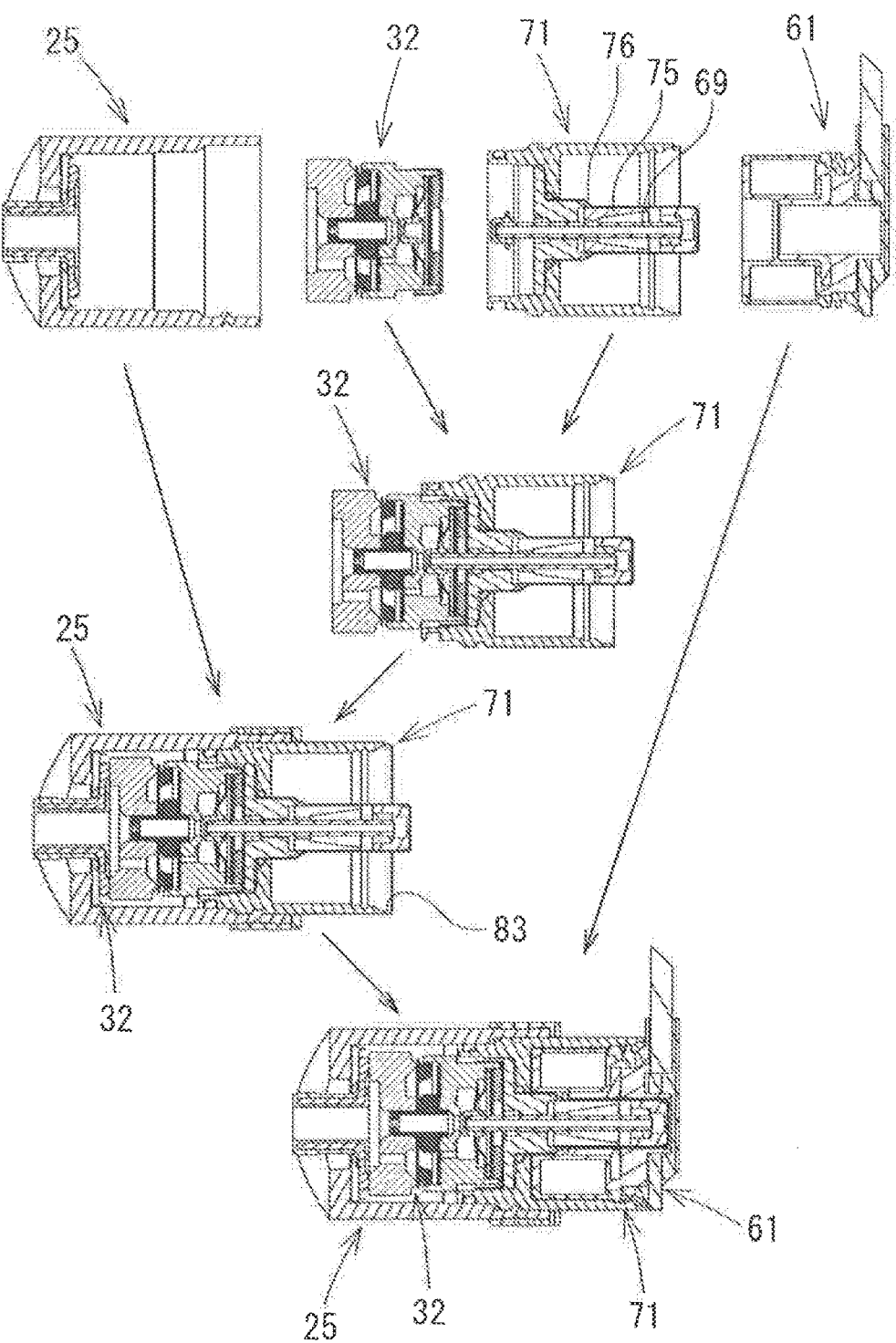
FIG. 6 is an explanatory view of the present exemplary embodiment, which illustrates a procedure of assembling a damping force generating mechanism (solenoid).

(Assembly Process) Next, a method of assembling the damping force regulation type damper 1 of the present exemplary embodiment will be described. Here, a procedure of assembling the damping force generating mechanism 31 will be described with reference to FIG. 6.

First, the case member 71 and the damping valve 32 are integrated. Here, the cap 76 in which the stator core 73, the core 74, the plunger 75, and the operating pin 69 are set in advance is set in the case member 71. In this state, the stator core 73, the core 74, the plunger 75, and the operating pin 69 are coaxially positioned with respect to the case member 71.

Next, the case member 71 and the damping valve 32, which are integrated, are inserted into the valve case 25. Further, the nut 38 is screw-coupled to the threaded portion 39 of the valve case 25, and the nut 38 is fastened such that the valve case 25, the damping valve 32, and the case member 71 are integrated. Further, the valve case 25 is bonded to the sidewall of the outer cylinder 3 in advance (see FIG. 1).

Next, the coil case 61 is inserted into the case member 71 from the opening 83 of the case member 71 fixed to the valve case 25. In this case, the retaining, ring 91 is mounted in the groove 93 of the coil case 61 in advance, and the O-ring 85 (seal member) is mounted in the seal groove 87 of the coil case 61. In addition, during the process of inserting the coil case 61, the diameter or the retaining ring 91 mounted in the groove 93 of the coil case 61 is gradually decreased while the retaining ring 91 slides on the tapered hole 84 of the case member 71, and the diameter of the retaining, ring 91 is increased when the retaining ring 91 faces the groove 95 of the case member 71 such that the retaining ring 91 is mounted in the a groove 95, that is, mounted between the groove 93 of the coil case 61 and the groove 95 of the case member 71. Further, the shaft side contact portions 98A and 98B and the shaft side contact portions 99A and 99B of the retaining ring 91 come into contact with the bottom portion 93A of the groove 93 of the coil case 61.

Further, when inserting the cod case 61, the diameter of the retaining ring 91 is decreased as the small diameter portions 97A, 97B, and 97C (see FIG. 5) come into contact with the tapered hole 84 of the case member 71, but the R shape having a radius larger than the standardized chamfering amount is formed on a portion to be contact with the tapered hole 84 in each of the small diameter portions 97A, 97B, and 97C, and as a result, it is possible to prevent the tapered hole 84, which serves as a seal surface of the O-ring 85 (seal member), from being damaged. Further, the sliding resistance between the retaining ring 91 and the tapered hole 84 when inserting the coil case 61 is reduced, and as a result, it is possible to reduce a three applied to the coil case 61, and to prevent the deformation of the coil case 61. Therefore, it is possible to prevent the deformation of the coil case 61 and prevent the deformation of the seal groove 87 serving as a seal surface of the O-ring 85, thereby preventing deterioration in sealability.

Meanwhile, during the process of inserting the coil case 61, the O-ring 85 mounted in the seal groove 87 of the coil case 61 is pressed (compressed) by the tapered hole 84 of the case member 71 and the tapered shaft 89 of the coil case 61 which approach the O-ring 85 while maintaining the parallel state, and finally, the O-ring 85 is elastically supported in the radial direction and the axial direction between the tapered hole 84 and the tapered shaft 89. In this state, the wall portion 88 of the seal groove 87 of the coil case 61 is pressed in the axial direction by a reaction force of the elastic force generated by the elastically deformed O-ring 85. Therefore, an axial force is generated between the coil case 61 of the solenoid 33 and the case member 71, and as a result, it is possible to prevent the axial play between the cod case 61 and the case member 71.

Further, the cap 76 of the case member 71 is inserted into the axial hole 64 of the coil case 61 in a state in which the coil case 61 is completely inserted, and as a result, the coil case 61 and the case member 71 may be reliably positioned coaxially, and the coil case 61, the plunger 75, and the operating pin 69 may be reliably positioned coaxially. In addition, the cap 76 is aligned by the O-ring 77 with respect to the case member 71, and the coil case 61 is aligned by the O-ring 85 with respect to the case member 71, and as a result the respective members may be aligned by the O-rings 77 and 85, respectively.

(Effect) According to the present exemplary embodiment, the coil case 61 is inserted into the case member 71 during the process of assembling the solenoid 33, such that the retaining ring 91 is mounted between the groove 93 formed in the outer peripheral surface 92 of the coil case 61 and the groove 95 formed in the inner peripheral surface 94 of the case member 71, and as a result, the coil case 61 and the case member 71 are integrated. In the state in which the coil case 61 and the case member 71 are integrated, the O-ring 85 (seal member) is elastically supported by the tapered hole 84 formed in the inner peripheral surface 94 of the case member 71 and the tapered shaft 89 formed on the outer peripheral surface 92 of the coil case 61, and the retaining ring 91 receives the axial force (reaction three of the elastic force) generated by the 85.

Since the retaining ring 91 receives the axial fore generated by the O-ring 85 as described above, it is possible to prevent a play between the coil case 61 of the solenoid 33 and the case member 71, thereby preventing abnormal noise from being generated from the damper 1. In addition, the O-ring 85 is supported by the tapered hole 84 (inclined surface) of the case member 71, and the distance from the axis (central line) of the solenoid 33 to the retaining ring 91 is approximately equal to the distance from the axis of the solenoid 33 to the O-ring 85, and as a result, it is possible to decrease an outer diameter (decrease a thickness) of the case member 71 and to decrease the size of the solenoid 33, particularly, the size of the damping force regulation mechanism 31 in comparison with the related art in which the O-ring 85 is received on the opening 83 side end face of the case member 71, that is, on a surface parallel to a plane perpendicular to the axis of the solenoid 33.

In addition, according to the present exemplary embodiment, the R shape having a radius larger than the standardized (specified) chamfering amount is formed on the portion of the case member 71, which is in contact with the tapered hole 84, that is, formed on the small diameter portions 97A, 97B, and 97C, when inserting the retaining ring 91 into the case member 71 of the coil case 61, and as a result, it is possible to prevent damage to the tapered hole 84 serving as a seal surface of the O-ring 85 when inserting the coil case 61 during the process of assembling the solenoid 33. Further, the sliding resistance between the retaining ring 91 tapered hole 84 of the case member 71 when inserting the coil case 61 is reduced, and as a result, it is possible to reduce the force applied to the coil case 61, and to prevent the deformation of the coil case 61. Therefore, it is possible to prevent the deformation of the coil case 61 and prevent the deformation of the seal groove 87 serving as a seal surface of the O-ring 85, thereby preventing deterioration in sealability.

Further, the present exemplary embodiment is configured such that the O-ring 85 (seal member) is elastically supported in the radial direction and the axial direction by the tapered hole 84 of the case member 71 and the tapered shaft 89 (inclined surface) of the coil case 61, but the coil case 61 side seal groove 87 does not need to have the shaft 89 (inclined surface) formed in a tapered shape, and the seal groove 87 may be configured by the pair of facing wall portions 88, and the bottom portion (groove bottom) which is parallel to the axis (central line) of the solenoid 33 and is continuously formed from the pair of wall portions 88.

As the damper according to the exemplary embodiment and the method of assembling the damper, the following aspects may be provided for example.

A first aspect of a damper includes: a cylinder in which a hydraulic fluid is encapsulated; a piston which slidably fitted into the cylinder; a piston rod which is connected to the piston and extends to an outside of the cylinder; and a damping force generating mechanism which has a damping valve that generates a damping force by controlling a flow of the hydraulic fluid generated as the piston slides in the cylinder. The damping force generating mechanism includes a coil case which accommodates a coil and has an axial hole; a case member in which the coil case is disposed at an opening side at one side of the case member and the damping valve is disposed at the other side; a plunger which is provided in the axial hole of the coil case and regulates the damping force of the damping valve while moving in an axial direction of the axial hole by energization to the coil; and a retaining ring which is mounted between a groove formed in an outer peripheral surface of the coil case and a groove formed in an inner peripheral surface of the case member so as to integrate the coil case and the case member. A seal member is provided between the coil case and the case member, such that the seal member is positioned closer to the opening side of the case member than the groove of the case member. The seal member is sandwiched between a tapered hole, which is formed in the case member and increases in diameter toward the opening, and the outer peripheral surface of the coil case such that the seal member elastically supports the coil case with respect to the case member in a radial direction and the axial direction of the coil case.

According to a second aspect, in the first aspect, the coil case includes a tapered shaft formed therein to increase in diameter toward the opening side of the case member.

According to a third aspect, in the second aspect, the tapered hole of the case member and the tapered shaft of the coil case are parallel to each other.

According to a fourth aspect, in any one of the first to third aspects, t the tapered hole of the case member is continuously formed from an inner peripheral surface of the case member in which the groove is formed.

According to a fifth aspect, in any one of the first to fourth aspects, the retaining ring includes a small diameter portion formed near a tip end thereof and having a radius of curvature smaller than a radius of a groove bottom of the coil case, and an R shape having a radius larger than a standardized chamfering amount is formed at least on the small diameter portion at a contact portion with the coil case.

According to a sixth aspect, in a method of assembling the damper according to any one of the first to fifth aspects, the damping force generating mechanism may be assembled by an assembling process including: integrating the case member and the damping valve; inserting the integrated case member and damping valve into a valve case; and inserting the coil case into the case member integrated with the valve case.

While only several exemplary embodiments of the present invention have been described above, it can be easily understood by those skilled in the art that various alterations and modifications may be made to the exemplary embodiments without substantially departing from novel teaching or advantages of the present invention. Therefore, the altered and modified aspects are also intended to be included in the technical scope of the present invention. The exemplary embodiments may be arbitrarily combined.

The present application claims priority based on Japanese Patent Application No. 2015-210969 filed on Oct. 27, 2015. The entire disclosure contents including the specification, claims, drawings, and abstract of Japanese Patent Application No. 2015-210969 filed on Oct. 27, 2015 are incorporated herein by reference.

DESCRIPTION OF SYMBOLS

1: Damper
2: Cylinder
5: Piston
6: Piston rod
31: Damping force generating mechanism
32: Damping valve
61: Coil case
61A: coil
64: Axial hole (coil case)
71: Case member
75: Plunger
83: Opening
84: Tapered hole
85: O-ring (seal member)
91: Retaining ring
92: Outer peripheral surface (coil case)
93: Groove
94: Inner peripheral surface (case member)
95: Groove

What is claimed is:

1. A damper comprising:
a cylinder in which a hydraulic fluid is encapsulated;
a piston which is slidably fitted into the cylinder;
a piston rod which is connected to the piston and extends to an outside of the cylinder; and
a damping force generating mechanism which has a damping valve that generates a damping force by controlling a flow of the hydraulic fluid generated as the piston slides in the cylinder,
wherein the damping force generating mechanism includes:
a coil case which accommodates at least one coil and has an axial hole;
a case member in which a first end of the coil case is disposed at an opening side at one side of the case member and the damping valve is disposed at the other side, such that the case member encloses the at least one coil;
a plunger which is provided in the axial hole of the coil case and regulates the damping force of the damping valve while moving in an axial direction of the axial hole by energization to the at least one coil; and
a retaining ring which is mounted between a groove formed in an outer peripheral surface at a second end of the coil case opposite to the first end of the coil case, and a groove formed in an inner peripheral surface of the case member so as to integrate the coil case and the case member,
wherein a seal member is provided between the coil case and the case member such that the seal member is positioned closer to the opening side of the case member than the groove of the case member, and
wherein the seal member is sandwiched between a tapered hole, which is formed in the case member and increases in diameter toward the opening, and the outer peripheral surface at the second end of the coil case opposite to the first end of the coil case such that the seal member elastically supports the coil case with respect to the case member in a radial direction and the axial direction of the coil case.

2. The damper of claim 1, wherein the coil case includes a tapered shaft formed therein to increase in diameter toward the opening side of the case member.

3. The damper of claim 2, wherein the tapered hole of the case member and the tapered shaft of the coil case are parallel to each other.

4. The damper of claim 1, wherein the tapered hole of the case member is continuously formed from an inner peripheral surface of the case member in which the groove is formed.

5. The damper of claim 1, wherein the retaining ring includes a small diameter portion formed near a tip end thereof and having a radius of curvature smaller than a radius of a groove bottom of the coil case, and an R shape having a radius larger than a standardized chamfering amount is formed at least on the small diameter portion at a contact portion with the coil case.

6. A method of assembling the damper of claim 1, wherein the damping force generating mechanism is assembled by an assembling process including:

integrating the case member and the damping valve;

inserting the integrated case member and damping valve into a valve case; and inserting the coil case into the case member integrated with the valve case.

7. A damper comprising:

a cylinder in which a hydraulic fluid is encapsulated;

a piston which is slidably fitted into the cylinder;

a piston rod which is connected to the piston and extends to an outside of the cylinder; and a damping force generating mechanism which has a damping valve that generates a damping force by controlling a flow of the hydraulic fluid generated as the piston slides in the cylinder, wherein the damping force generating mechanism includes:

a coil case which accommodates at least one coil and has an axial hole;

a case member in which the coil case is disposed at an opening side at one side of the case member and the damping valve is disposed at the other side;

a plunger which is provided in the axial hole of the coil case and regulates the damping force of the damping valve while moving in an axial direction of the axial hole by energization to the at least one coil; and a retaining ring which is mounted between a groove formed in an outer peripheral surface of the coil case and a groove formed in an inner peripheral surface of the case member so as to integrate the coil case and the case member, wherein a seal member is provided between the coil case and the case member such that the seal member is positioned closer to the opening side of the case member than the groove of the case member, and wherein the seal member is sandwiched between a tapered hole, which is formed in the case member and increases in diameter toward the opening, and the outer peripheral surface of the coil case such that the seal member elastically supports the coil case with respect to the case member in a radial direction and the axial direction of the coil case, wherein the coil case includes a tapered shaft formed therein to increase in diameter toward the opening side of the case member.

8. The damper of claim 7, wherein the tapered hole of the case member and the tapered shaft of the coil case are parallel to each other.

9. A damper comprising:

a cylinder in which a hydraulic fluid is encapsulated;

a piston which is slidably fitted into the cylinder;

a piston rod which is connected to the piston and extends to an outside of the cylinder; and a damping force generating mechanism which has a damping valve that generates a damping force by controlling a flow of the hydraulic fluid generated as the piston slides in the cylinder, wherein the damping force generating mechanism includes:

a coil case which accommodates at least one coil and has an axial hole;

a case member in which the coil case is disposed at an opening side at one side of the case member and the damping valve is disposed at the other side;

a plunger which is provided in the axial hole of the coil case and regulates the damping force of the damping valve while moving in an axial direction of the axial hole by energization to the at least one coil; and a retaining ring which is mounted between a groove formed in an outer peripheral surface of the coil case and a groove formed in an inner peripheral surface of the case member so as to integrate the coil case and the case member, wherein a seal member is provided between the coil case and the case member such that the seal member is positioned closer to the opening side of the case member than the groove of the case member, and wherein the seal member is sandwiched between a tapered hole, which is formed in the case member and increases in diameter toward the opening, and the outer peripheral surface of the coil case such that the seal member elastically supports the coil case with respect to the case member in a radial direction and the axial direction of the coil case, wherein the retaining ring includes a small diameter portion formed near a tip end thereof and having a radius of curvature smaller than a radius of a groove bottom of the coil case.

10. The damper of claim 9, wherein an R shape having a radius larger than a standardized chamfering amount is formed at least on the small diameter portion at a contact portion of the retaining ring with the coil case.

* * * * *